United States Patent [19]
Zuk

[11] 3,962,549
[45] June 8, 1976

[54] THRESHOLD DETECTOR CIRCUITRY, AS FOR PCM REPEATERS

[75] Inventor: Borys Zuk, New Brunswick, N.J.

[73] Assignee: RCA Corporation, New York, N.Y.

[22] Filed: Jan. 29, 1975

[21] Appl. No.: 545,156

[52] U.S. Cl. .................... 179/16 EA; 179/15 AD; 328/146; 328/164
[51] Int. Cl.² .......................................... H04B 3/36
[58] Field of Search ......... 179/15 AD, 16 E, 16 EA; 328/146, 149, 164; 178/70 R, 70 TS; 235/92 PB, 92 TE

[56] References Cited
UNITED STATES PATENTS

| | | | |
|---|---|---|---|
| 3,384,711 | 5/1968 | Boxall | 178/70 R |
| 3,633,045 | 1/1972 | Nordling | 328/164 |
| 3,735,152 | 5/1973 | Oda | 328/164 |
| 3,737,585 | 6/1973 | Ghosh | 179/15 AD |
| 3,777,268 | 12/1973 | Cleobury et al. | 179/15 AD |
| 3,873,775 | 3/1975 | Chown | 179/15 AD |

*Primary Examiner*—Kathleen H. Claffy
*Assistant Examiner*—Randall P. Myers
*Attorney, Agent, or Firm*—H. Christoffersen; S. Cohen; A. L. Limberg

[57] ABSTRACT

Successively larger fractions of a first composite signal are compared with an entire second composite signal to obtain control signals. The composite signals comprise similar direct components with push-pull a-c signals superimposed thereon. One of these control signals may be used to standardize the average amplitude of the push-pull signals by causing them to be attenuated when they exceed a given amplitude, and at least one other, for controlling the synchronous regeneration of the a-c signals. The invention is useful for PCM repeaters in telephone cables.

14 Claims, 4 Drawing Figures

THRESHOLD DETECTOR CIRCUITRY, AS FOR PCM REPEATERS

The present invention relates to detector circuitry useful, for example, in discriminating PCM pulses from noise on a telephone cable pair to facilitate noise-free regeneration of the pulses in repeater circuitry.

On short-haul trunk lines of less than 16 to more than 40 kilometers length, telephone communications often are carried out using pulse code modulation (PCM) signals. In one system, twenty-four channels, each with a frequency spectrum extending up to 4 kHz, are each sampled 8000 times per second. The sample from each channel is volume-compressed and applied to an analog-to-digital converter to develop a seven-digit binary code. Another digit is added to each code for supervisory signaling in that channel. The eight-digit binary codes are assembled in recurring sequence, each sequence having a framing digit added thereto to form a 193-digit framing period. The polarity of each succeeding pulse indicating a binary ONE alternates between positive and negative, thereby to develop a psuedo-ternary signal having a relatively low-valued direct component. Steps are also taken to assure that a pulse occurs at least once in every eight-bit code group.

PCM signals can be periodically regenerated so as to discard the noise accumulated over a length of telephone line. The regenerative repeaters may be located at 2000 meters intervals along a 19- or 22- guage cable pair, replacing the loading coils used for direct voice transmission. The regenerative repeaters are not bi-directional devices and so are installed in inverse-parallel pairs at each repeater location on the line. Each pair of repeaters obtains operating potential provided by a series-avalanche diode voltage regulator responsive to a direct current simplexed on the cable pair.

The PCM repeater determines whether each incoming pulse is a bona fide input pulse and, if it is, provides a regenerated output pulse. A clock signal must be developed to time the regenerated pulses accurately.

In prior art repeaters the peak amplitudes of amplified incoming pulses are adjusted by automatic gain control (AGC) apparatus, which often includes automatic line build-out circuitry to compensate for shorter than usual spacing between repeaters. Then, the standardized amplitude pulses are applied to threshold detection circuits to determine when a positive-going pulse occurs and when a negative-going pulse occurs. A problem which exists is how to track the threshold of these detection processes against the standardized pulse amplitudes in an accurate manner.

The present invention contemplates solution of this type of tracking problem by carrying out detection for AGC purposes and for determination of signals crossing threshold levels concurrently, with accurately scaled relative input signals providing the means of tracking the detection functions against each other. An input signal is passed through a gain-controlled amplifier to obtain push-pull amplified signals superimposed on a common-mode direct component--which combined signals shall be called "composite signals". A first fraction of at least one of the composite signals is compared against the entire other composite signal and, if the relatively small fraction exceeds the entire other signal, AGC signal is developed to reduce the amplitudes of the push-pull amplified signals. This AGC method develops a standardized pulse amplitude in precisely determined ratio to the common-mode direct-potential component of the composite signals. Simultaneously, a second fraction, larger than the first, of at least one of the composite signals is compared against the entire other composite signal, to obtain threshold detection at a welldefined fraction of standardized pulse amplitude. In the drawing:

Figure 1:
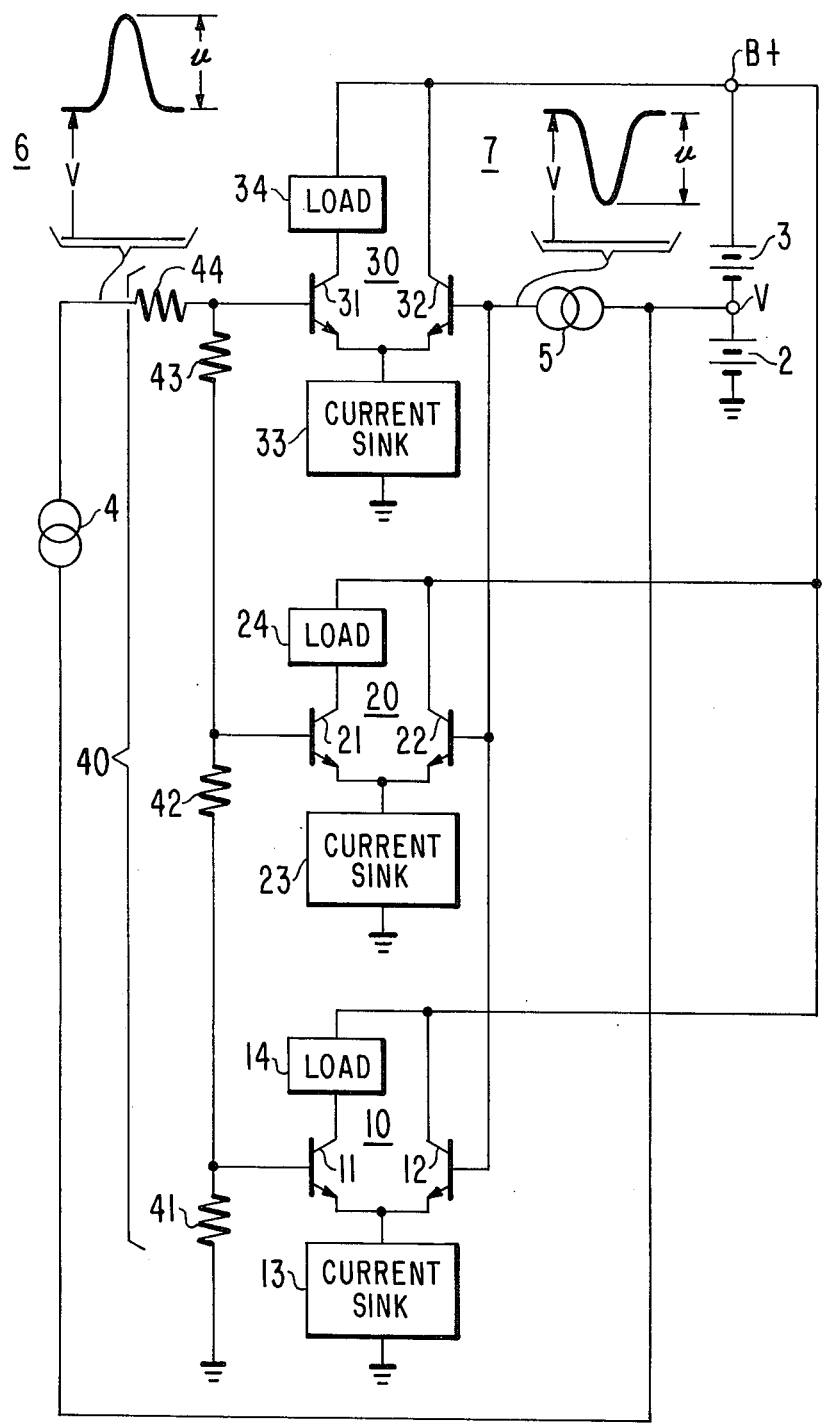
FIG. 1 is a schematic diagram, partially in block form, of basic threshold detection circuitry in which the present invention is embodied.

Referring to FIG. 1, an operating potential B+ is supplied by the serial connection of batteries 2 and 3. Battery 2 supplies an intermediate potential V upon which the push-pull signals provided by sources 4 and 5 are superimposed. At particular times, these push-pull signals may comprise pulses of opposite polarity and of the same instantaneous absolute amplitude v, and each superimposed on the intermediate potential V, as shown in inset waveforms 6 and 7.

Three potential comparators 10, 20 and 30 are shown, each comprising a pair of transistors (11, 12; 21, 22; and 31, 32, respectively) with emitter electrodes connected together and to a current sink (13; 23; and 33, respectively). The current sinks 13, 23 and 33 may comprise simple resistors (13', 23' and 33' of FIG. 2, respectively). Alternatively, other types of current sinks may be used, such as that provided by the collector electrode of an NPN transistor with its base-emitter circuit biased to give constant collector current operation.

The base electrodes of transistors 12, 22 and 32 are directly connected to receive the signal potential supplied by source 5 superimposed upon the potential V. A potential divider 40 comprising resistors 41, 42, 43 and 44 supplies progressively larger fractions of the composite signal and direct potential, provided by source 4 and battery 2, to the base electrode of transistors 11, 21 and 31, respectively. Resistors 41, 42, 43 and 44 have resistances $R_{41}$, $R_{42}$, $R_{43}$ and $R_{44}$, respectively, which sum to a value $R_{40}$.

So long as the base potentials of transistors 12, 22 and 32 are substantially more positive than those of transistors 11, 21 and 31, respectively, the former transistors will be conductive to provide current to current sinks 13, 23 and 33, respectively. This will be so under quiescent conditions where the pulse amplitude $v$ is zero and under conditions where sources 4 and 5 supply negative-going and positive-going pulses, respectively.

Assume, on the other hand, that the sources 4 and 5 provide positive-going and negative-going pulses, respectively, of potential v (as shown in FIG. 1). The pulse amplitude $v_{10}$ required for substantially equal potentials at the base electrodes of transistors 11 and 12 defines the condition for toggling comparator 10. This condition is expressed mathematically as follows:

$$\left(\frac{R_{41}}{R_{40}}\right)(V+v_{10}) = V-v_{10} \qquad (1)$$

Solving equation 1, for $v_{10}$, the following equation is obtained $$v_{10} = \left(\frac{R_{40} - R_1}{R_{40} + R_{41}}\right) V \qquad (2)$$

The pulse amplitude $v_{20}$ required for substantially equal potentials at the base electrodes of transistors 21 and 22 defines the condition for toggling comparator 20. This condition is expressed mathematically as follows:

$$\left(\frac{R_{41} + R_{42}}{R_{40}}\right)(V+v_{20}) = V-v_{20} \qquad (3)$$

Solving equation 3 for $v_{20}$, the following equation is obtained.

$$v_{20} = \left(\frac{R_{40} - R_{41} - R_{42}}{R_{40} + R_{41} + R_{42}}\right) V \qquad (4)$$

The pulse amplitude $v_{30}$ required for substantially equal potentials at the base electrodes of transistors 31 and 32 defines the condition for toggling comparator 30. This condition is expressed mathematically as follows:

$$\left(\frac{R_{41} + R_{42} + R_{43}}{R_{40}}\right)(V + v_{30}) = V-v_{30} \qquad (5)$$

Solving equation 5 for $v_{30}$, the following equation is obtained:

$$v_{30} = \left(\frac{R_{40}-R_{41}-R_{42}-R_{43}}{R_{40}+R_{41}+R_{42}+R_{43}}\right) V = \left(\frac{R_{44}}{R_{40}+R_{41}+R_{42}+R_{43}}\right) V \qquad (6)$$

By cross-solving equations 2 and 4, $v_{20}$ can be expressed in terms of $v_{10}$ as follows:

$$v_{20} = \left(\frac{R_{40} - R_{41} - R_{42}}{R_{40} + R_{41} + R_{42}}\right)\left(\frac{R_{40} + R_{41}}{R_{40} - R_{41}}\right) v_{10} \qquad (7)$$

By cross-solving equations 2 and 6, $v_{30}$ expressed in terms of $v_{10}$ can be obtained as follows:

$$v_{30} = \left(\frac{R_{44}}{R_{40} + R_{41} + R_{42}}\right)\left(\frac{R_{40} + R_{41}}{R_{40} - R_{41}}\right) v_{10} \qquad (8)$$

The important thing to notice about this way of expressing threshold potentials $v_{20}$ and $v_{30}$ required to toggle comparators 20 and 30 is that they are related to the threshold potential $v_{10}$ required to toggle comparator 10 by ratios determined solely by the proportions between resistances $R_{41}$, $R_{42}$, $R_{43}$ and $R_{44}$ of the resistors 41, 42, 43 and 44 in the potential divider 40. Only the relative values and not the absolute values of $R_{41}$, $R_{42}$, $R_{43}$ and $R_{44}$ affect the relationships among $v_{10}$, $v_{20}$, and $v_{30}$ — so long as the comparators 10, 20 and 30 do not significantly load the resistive potential divider and affect its division ratios. The common-mode potential $V$ does not affect the relationship among $v_{10}$, $v_{20}$ and $v_{30}$, either. Since the proportioning between resistances of diffused or implanted resistors within a monolithic integrated circuit can be maintained to close tolerances, comparators connected as shown in FIG. 1 can be used for close tracking between different threshold detection levels.

Figure 2:
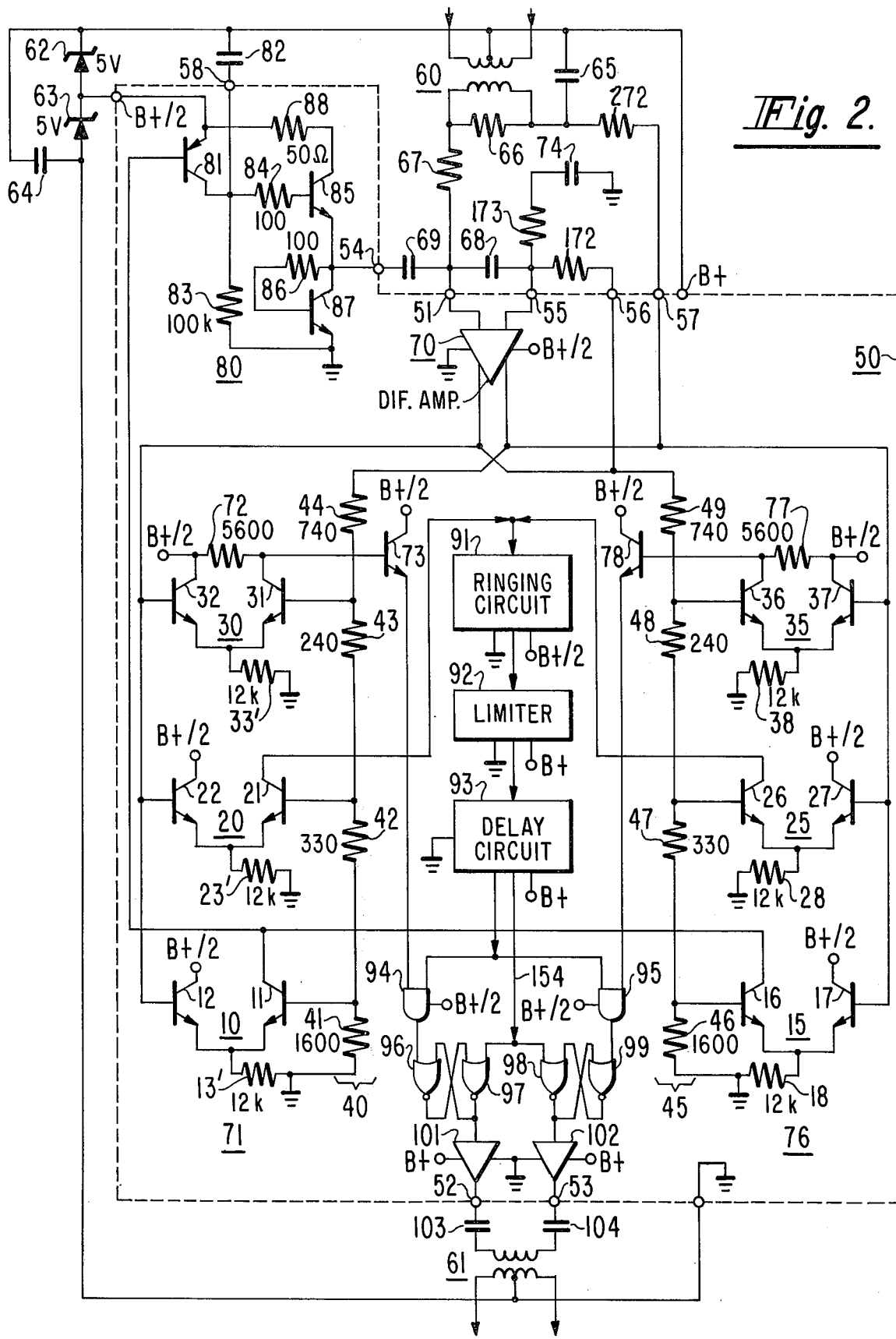
FIG. 2 is a schematic diagram, partially in block form, of a PCM repeater using threshold detection circuitry in which the present invention is embodied.

FIG. 2 is a schematic diagram of a monolithic integrated circuit PCM repeater 50 which relies on the type of tracking described above. Line transformer 60 accepts input PCM signal from a telephone cable pair connected to its center-tapped primary winding, and its secondary winding supplies PCM signal to terminal 51 of repeater 50. Line transformer 61 provides PCM signal to a succeeding telephone cable pair from its center-tapped secondary winding when it receives regenerated output pulses at its primary winding. These are supplied from output terminals 52 and 53, respectively, of the repeater 50 via coupling capacitors 103 and 104.

Avalanche diodes 62 and 63 are connected between the center taps of the center-tapped windings of transformers 60 and 61. The passage of the direct operating current simplexed on the telephone cable pair, through the avalanche diodes 62 and 63 causes offset potentials (e.g., 5 volts each) to develop across these diodes. The offset potentials are used as operating potentials by the repeater 50 and another similar repeater (not shown) connected between transformers 61 and 60 to provide repeater operation in the opposite direction. Capacitor 64 connected across the avalanche diodes 62 and 63 by-passes transient disturbances.

Capacitors 64 and 65 by-pass the end of the secondary winding of transformer 60 connected between resistors 66 and 272' to local ground potential insofar as PCM signals are concerned. Resistor 66 terminates the secondary winding of transformer 60. Resistors 67 and capacitor 69 build out the line for connection to input terminal 51 of the repeater 50. "Building out the line" refers to the practice of making a shorter than standard length cable pair appear to be standard length by passing the signal received from it through limited bandwidth circuits.

At terminal 54, for reasons to be explained, a gain control circuit 80 offers a resistance which decreases as a function of the amplitude of incoming PCM pulses. This resistance is coupled via capacitor 69 to input terminal 51 to provide adjustable shunt attenuation of the signal applied to input terminal 51. That is, the resistance of resistor 67 is the series arm of an L-pad configuration having as a shunt arm the variable resistance offered at terminal 54 in series with the reactance of capacitor 69. (This shunt arm is parallelled by the reactance of capacitor 68, used to stabilize the differential amplifier 70.) This L-pad configuration acts as an adjustable potential divider to provide an automatic line build out (LBO) function. The resistance of resistor 67 is chosen relatively large compared to the resistance of resistor 66, so termination of the input cable pair is not appreciably affected by the adjustment of the shunt attenuation of input signal at terminal 51.

At high levels of incoming PCM signal (as would be characteristic of relatively short preceding cable pairs) the resistance at terminal 54 is caused to be low so it together with the reactance of capacitor 69 attenuate the PCM signal and integrate it slightly to reduce its highfrequency content. At low levels of incoming PCM signal (as would be characteristic of relatively long preceding cable pairs), the resistance at terminal 54 is caused to be high so the incoming signal is neither attenuated nor integrated appreciably by the L-pad configuration. For this incoming signal condition, high-frequency content in the signal already has been attenuated by the larger cable pair length.

A differential amplifier 70 within PCM repeater 50 has inverting and non-inverting input terminals connected to terminals 51 and 55 at the interface of repeater 50 and the external circuitry. Responsive to input PCM signals at terminals 51, a differential amplifier 70 supplies push-pull output signal potentials, respectively, each superimposed on a positive common-mode potential to terminals 56 and 57 at the interface of repeater 50 and the external circuitry. Direct-coupled negative feedback is applied to differential amplifier 70 by means of resistor 172 connected between terminals 56 and 55 and by means of resistors 272', 66 and 67 serially-connected between terminals 57 and 51. Resistor 173 and capacitor 74 are serially-connected between terminal 55 and local ground to reduce the degenerative feedback insofar as the PCM signals are concerned and to maintain the gain of amplifier 70 relatively high for these signals.

The push-pull signals provided at terminals 56 and 57 correspond to those supplied by sources 4 and 5 in the FIG. 1 circuit insofar as application to the threshold detector circuitry 71 comprising resistive potential divider 40 and the potential comparators 10, 20 and 30 is concerned. Threshold detector circuitry 76 is similar in structure to threshold detector circuitry 71, its elements having reference numerals larger by five than corresponding elements in threshold detector circuitry 71. Threshold detector circuitry 76 receives push-pull signals from terminals 56 and 57 in the opposite sense that they are applied to threshold detector circuitry 71. Threshold detector circuitry 71 responds to incoming PCM pulses which are of a polarity to cause the potentials at terminals 56 and 57 to become less positive and more positive, respectively. Threshold detector circuitry 76 responds to incoming PCM pulses which are of a polarity to cause the potentials at terminals 56 and 57 to become more positive and less positive, respectively.

When incoming PCM signals of very low amplitude are supplied PCM repeater 50, the potentials at terminals 56 and 57 are nearly equally positive. In comparator 10, because of the potential divider of network 40, transistor 11 has its base electrode less positively biased than that of transistor 12. So, transistor 11 and, for similar reason, transistor 16 in comparator 15 are each non-conductive and withdraw no current from the base electrode of transistor 81 in the gain control circuit 80. Transistor 81 is, therefore, non-conductive. Capacitor 82, external to PCM repeater 50, and connecting its terminal 58 to local B+, can be charged to full B potential by bleeder resistor 83 connected between terminal 58 and local ground. This reduces the direct potential coupled by resistor 84 to the base electrode of transistor 85 and cuts off conduction in transistor 85. Transistor 85 therefore supplies no emitter current. There is no substantial current flow through resistor 86 to the base electrode of transistor 87, so transistor 87 is substantially non-conductive. The non-conductivity of transistors 85 and 87 presents a high resistance at terminal 54, and there is substantially no shunt attenuation afforded to a signal coupled to terminal 51 via resistor 67.

Whenever an amplified PCM pulse exceeds standard amplitude one or the other--depending on the direction of the pulse--of potential comparators 10 and 15, will withdraw current from the base electrode of transistor 81. Transistor 81 responds with collector current flow that counteracts the tendency of resistor 83 to maintain charge on a capacitor 82 and raises the potential at the collector electrode of transistor 81 to a more positive level. This potential, which is substantially direct because of the filtering action of capacitor 82, biases transistor 85 into conduction. The resulting direct emitter current flow from transistor 85 flows in part through resistor 86 to bias transistor 87 into conduction, conditioning transistor 87 to accept at its collector electrode the rest of the emitter current of transistor 85.

Now, it is well-known that the emitter resistance $R_e$ of a transistor (in ohms) is related to its base resistance $R_b$ (in ohms), its common-emitter forward current gain $\beta$ and its emitter current level $I_e$ (in milliamperes) in substantially the following way.

$$R_e = \frac{R_b}{\beta} + \frac{26}{I_E} \qquad (9)$$

This expression is also known to express the resistance at the collector of a transistor (such as 87) which is selfbiased--that is, a transistor with its base biased solely by collector-to-base feedback. (This comes about because the self-biased transistor is a two-terminal network and necessarily has to present the same impedance at both of its terminals to avoid violation of Kirchoff's Laws). In the expression above, the factor 26 millivolts may in fact range upward to 33 millivolts for some transistor designs. In any case, the $26/I_E$ term predominates in the expression for $R_e$ except at very high current levels. The increased flow of $I_E$ in each of transistors 85 and 87 responsive to standard pulse amplitude being exceeded at terminals 56 and 57 causes the parallelled $R_e$ of transistors 85 and 87 to decrease in value. This decreased resistance provides increased shunt attenuation of the PCM signal applied to input terminal 51. This completes a negative feedback loop which counteracts any tendency of the amplitudes of pulses at terminals 56 and 57 to exceed standard amplitude. The gain and dynamic range of the loop is such that potential comparators 10 and 15 are operated in their linear differential amplification range. Therefore, resistors 13' and 18 provide substantially constant current sinks.

For PCM signals, transistors 85 and 87 exhibit complementary $R_e$ variations. Since capacitor 82 by-passes PCM signals, $R_b$ for transistor 85 is substantially equal to the resistance of resistor 84. $R_b$ for transistor 87 is the resistance of resistor 86, chosen to be the same as that of resistor 84. The resistances of resistors 84 and 86 are chosen so the $R_p$ term moderates the change in $R_e$ due to the $26/I_E$ term and makes it less dependent on $I_E$ variation caused by the signal being attenuated. Transistors 85 and 87, being manufactured with equal dimensions and by identical processes, have equal $\beta$'s. Resistor 88 limits the maximum value of $I_E$ to avoid over-dissipation of transistors 85 and 87.

Resistive potential dividers 40 and 45 are proportioned so that unless the pulse amplitudes at terminals 56 and 57 exceed 70% of standard pulse amplitude, transistors 21 and 26 in comparators 20 and 25 are maintained nonconductive. Whenever and for so long as that amplitude is exceeded, transistor 21 or 26, depending upon the sense of the pulse, will be switched into conduction, causing a pulse of collector current to flow. The choice of the 70% threshold level causes the pulse of collector current to contain substantially as much energy at the second harmonic of pulse frequency as possible, presuming the pulse applied to the threshold detector circuitry to have a waveshape resembling either a Gaussian or a cosine-squared pulse. The pulses of collector current flow alternately in transistors 21 and 26 and are used to shock-excite a ringing circuit 91 conventionally comprising a high-Q LC tank circuit. (The term "ringing circuit" in this application refers to an antiresonant circuit stimulated by applied energy to oscillate at its natural frequency. That is, the term is used in the conventional sense and not in the special sense, encountered in telephony, of referring to a subscriber-signalling circuit.) The oscillations induced in the ringing circuit are supplied to a limiter 92 which converts them to a square wave signal which is used as a clock signal in the generation of repeated PCM signal. A pulse delay circuit 93 provides delayed response to edges of this square wave to provide negative-logic "ones" first as input signals to AND gates 94 and 95. Pulse delay circuit 93 also provides a delayed clock signal to a RESET line 154.

Resistive potential dividers 40 and 45 are further proportioned so that unless the pulse amplitudes at terminals 56 and 57 exceed 50% of standard pulse amplitude, transistors 31 and 36 in comparators 30 and 35 are maintained nonconductive. If on the other hand, the pulse amplitudes at terminals 56 and 57 exceed 50% of standard pulse amplitude comparators 30 and 35 furnish decision signals to RS flip-flops that govern regeneration of output pulses to appear at terminals 52 and 53. This may be more particularly described as follows. If negative-going pulse at terminal 56 and positive-going pulse at terminal 57 exceed a threshold of 50% standard pulse amplitude, transistor 31 will be switched into conduction developing a pronounced potential drop across its collector resistor 72. This drop is coupled via a common-collector amplifier transistor 73 to apply a sustained negative-logic "ONE" as second input signal to AND gate 94. The subsequent appearance of a negative-logic ONE in the first input signal of AND gate 94 causes it to apply a set signal to the RS flip-flop comprising NOR gates 96 and 97. The RS flip-flop is then reset by the delayed clock signal appearing on RESET line 154. The pulse defined by this SET followed by RESET operation is amplified by an output amplifier 101 to cause a regenerated pulse to appear at terminal 52. Gates 95, 98 and 99 and output amplifier 102 function in corresponding fashion to gates 94, 96 and 97 and output amplifier 101, respectively, except they are connected to cause a regenerated pulse to appear at terminal 53 whenever a positive-going pulse at terminal 56 and a negative-going pulse at terminal 57 exceed a threshold of 50% of standard pulse amplitude.

The output pulses from output amplifiers 101 and 102 are of the same sense. However, since output amplifiers 101 and 102 are coupled to opposite ends of the primary winding of transformer 61, the output pulses coupled from output amplifier 101 will have the opposite sense as the output pulses from output amplifier 102 insofar as the combined output pulses supplied from the secondary winding of transformer 61 to the cable pair are concerned. Capacitors 103 and 104 may be chosen small enough to differentiate the PCM signals slightly to compensate for integration of the PCM signals along the following cable pair.

A threshold level of 50% of standard pulse height is used to decide whether or not there is indeed an incoming pulse which should be regenerated, based on the presumption that the noise on the cable pair affects the ONE's and ZERO's corresponding to pulse presence and pulse absence, respectively, at each bit interval. Most of the time, this is a good presumption because: (a) the amplitude of impulse or click noise on the cable pair is constrained, (b) there is integration of the impulse or click noise in the cable pair and in the LBO network preceding the PCM repeater and (c) much of the noise on the cable pair is Gaussian noise.

Figure 3:
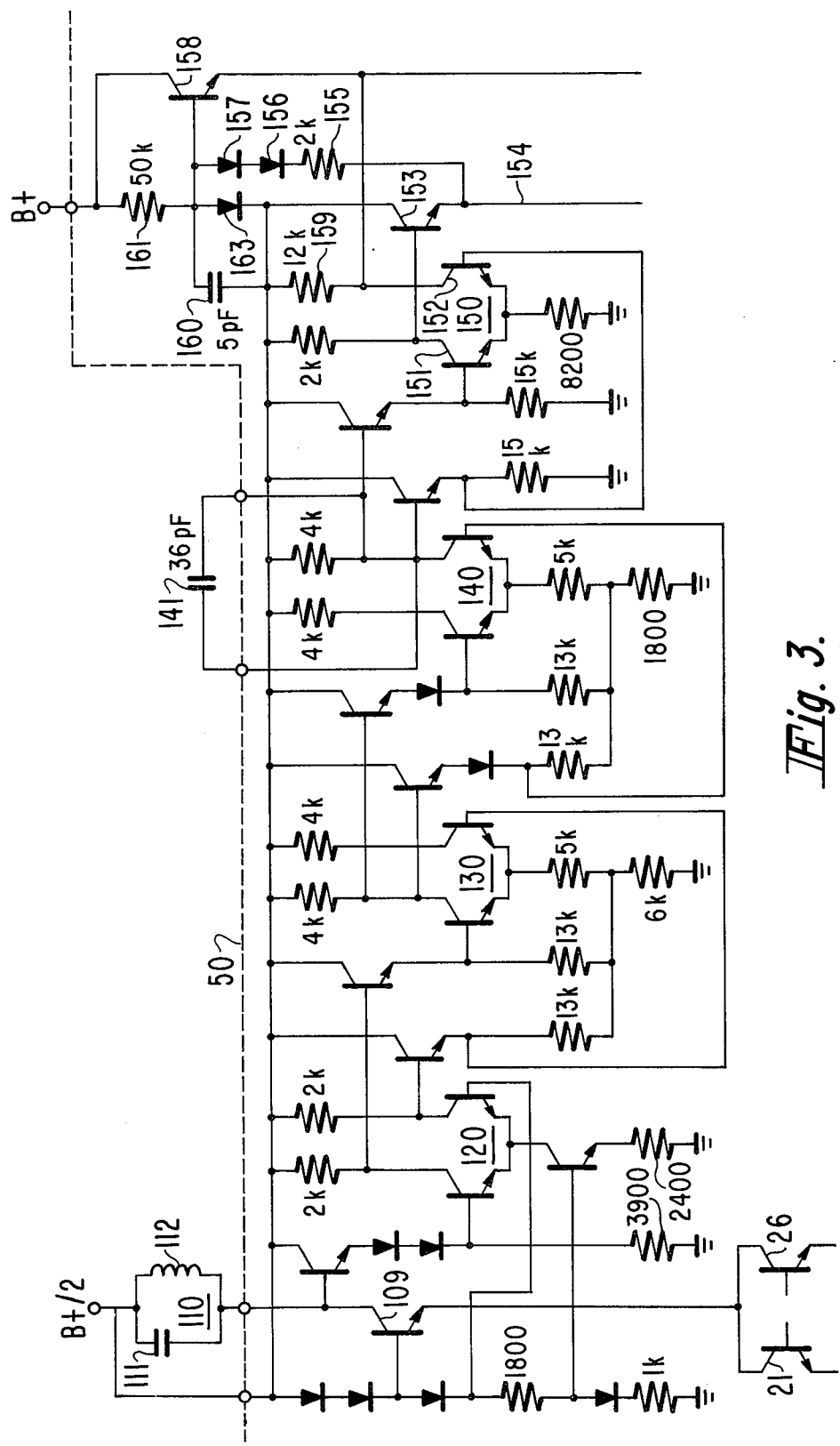
FIG. 3 is a schematic diagram of a ringing circuit, limiter and pulse delay circuit suitable for use in the FIG. 2 PCM repeater.

FIG. 3 is a schematic diagram of representative ringing circuit 91, limiter 92, and delay circuit 93 shown in blocks in FIG. 2. Pulses of collector current from transistors 21 and 26 are coupled via a common-base amplifier transistor 109 to ring an LC tank circuit 110 comprising parallelly connected capacitor 11 and inductor 112. The tank circuit 110 is tuned to ring at a 1.544 MHz frequency. The Q of the tank circuit 110 is high (of the order of 100) so it rings to provide a slowly damped sine wave. The slowly damped sine wave is amplified and limited in the emitter-coupled transistor differential amplifier (or longtailed pair) 120 to obtain a square wave. This square wave is amplified and limited further in the emitter-coupled transistor differential amplifier 130. The doubly-limited wave is amplified and limited a third time by the emittercoupled transistor differential amplifier 140.

Capacitor 141 is used to integrate the triplylimited wave to obtain substantially trapezoidal waveforms, which are compared in a differential amplifier 150 comprising emitter-coupled transistors 151 and 152. This comparison results in a square wave delayed in time with respect to the earlier square wave. This delayed square wave appears at the collector electrode of transistor 151 and is coupled by a common-collector amplifier transistor 153 to the RESET line 154 for the RS flip-flops formed respectively by NOR gates 96 and 97 and by NOR gates 98 and 99.

Negative-going edges of a delayed square wave complementary to that appearing at the collector electrode of transistor 151 appear as short pulses at the collector electrode of transistor 152 and are coupled to the AND gates 94 and 95 to time SET for the RS flip-flops comprising NOR gates 96, 97, 98 and 99. During the previous time when the delayed square wave potential on RESET line 154 has been at its less positive value, this potential has been coupled via elements 155, 156 and 157 to the base electrode of transistor 158 to hold that base electrode below the B+/2 supply potential. Also, during this previous time, the emitter electrode of transistors 158 has been coupled to the B+/2 potential by means of the collector resistor 159 of transistor 152. Consequently, transistor 158 has, during this previous time, been non-conductive. When the delayed square wave at the collector electrode of transistor 151 makes its negative-going transition, at the same time the delayed square wave appearing on RESET line 154 makes a positive-going transition so that the base electrode of transistor 158 is no longer clamped by elements 155, 156 and 157. As the distributed capacitance 160 is charged via the bleeder resistor 161, the potential at the base electrode of transistor 158 rises and after a brief time (about 50 nanoseconds) resistor 158 becomes conductive. Thereafter, the emitter-follower action of transistor 158 causes the collector potential of transistor 152 to follow the increasing base potential of transistor 158, which increasing potential is developed by the continued charging of capacitor 160. When capacitor 160 is sufficiently charged, clamp diode 163 will be biased into forward conduction to prevent further increase of the base potential of transistor 158. The clamping action of diode 163 is such to halt the increase of the emitter potential of transistor 158 when that potential has reached a value of B+/2. The just described action is responsible for the pulses at the collector electrode of transistor 152 being of substantially shorter duration than the opposite polarity square wave pulses on RESET line 154.

Figure 4:
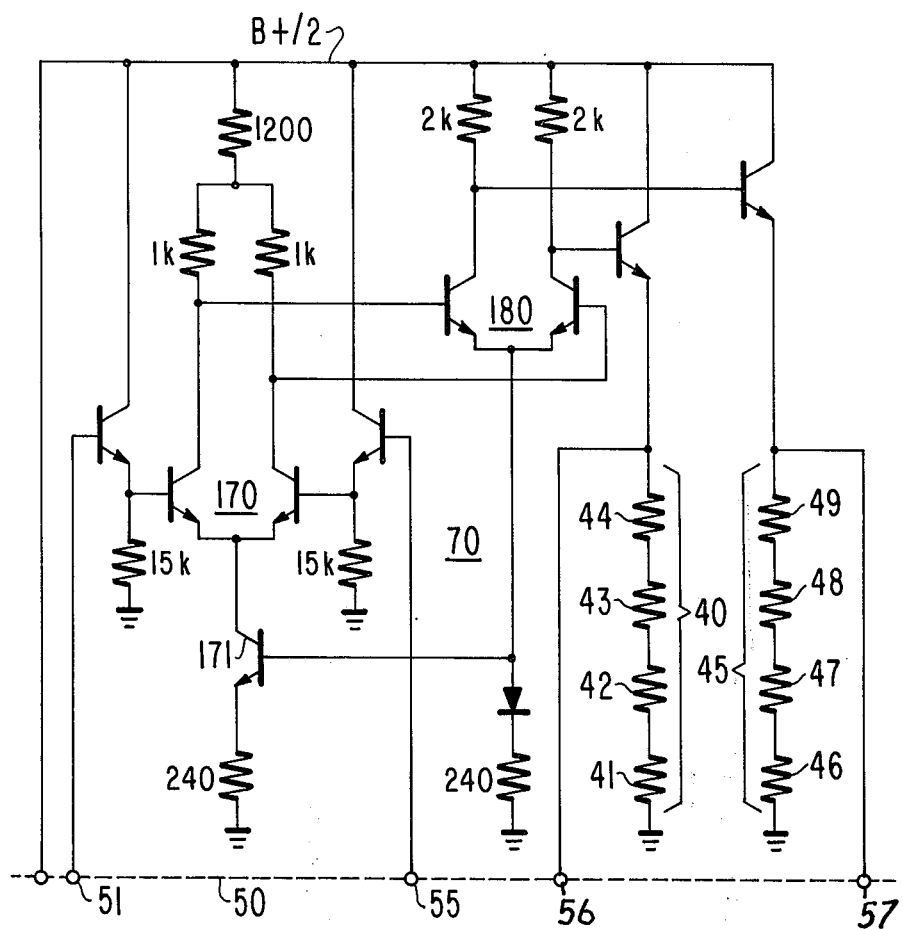
FIG. 4 is a schematic diagram of a differential amplifier suitable for use in the FIG. 2 PCM repeater.

FIG. 4 is a schematic diagram of a differential amplifer 70 of known type, comprising cascaded emitter-coupled transistor differential amplifiers 170 and 180. Rather than using a shunt attenuator gain control circuit 80 at the input terminal 51 of differential amplifier 70 as shown in FIG. 2, the AGC potential developed across resistor 83 may be coupled by a common-collector amplifier transistor to the emitter electrode of transistor 171 to reduce its collector current. This will, as is well-known, reduce the transconductance of the emitter-coupled transistor differential amplifier 170.

What is claimed is:

1. Threshold detection circuitry comprising in combination:
   means providing a first composite signal including a signal component of amplitude v superimposed on a direct component of larger amplitude V;
   means providing a second composite signal including a signal component concurrent with the signal component of the first composite signal but of amplitude -v superimposed on a direct component of amplitude V;
   means for dividing said first composite signal to obtain a plurality of fractional signals, said fractional signals comprising successively larger fractions of said first composite signal; and
   a like plurality of comparators, each receptive of a different one of said fractional signals and of the entire second composite signal, each comparator for indicating whether or not the amplitude of its fractional signal exceeds that of said entire second composite signal.

2. Threshold detection circuitry comprising in combination:
   means providing a first composite signal including a signal component of amplitude v superimposed on a direct component of larger amplitude V;
   means providing a second composite signal including a signal component concurrent with the signal component of the first composite signal but of amplitude -v superimposed on a direct component of amplitude V;
   a potential divider with an input circuit across which said first composite signal is applied and with a plurality of taps for obtaining successively larger fractions of said first composite signal; and
   a plurality of differential amplifiers, each having first and second input terminals, each of said first input terminals being connected to a different one of said taps along said potential divider, and said second composite signal being applied to all of said second input terminals.

3. Threshold detection circuitry comprising: gain-controlled amplifier means receptive of an input pulse signal for producing first and second pulse signals balanced and superimposed on a common-mode signal, which pulse signals are of an amplitude dependent upon that of said input pulse signal, the first pulse signal superimposed on said common-mode signal being identified as a first composite signal and the second pulse signal of opposite sense from said first pulse signal and superimposed on said common-mode signal being identified as a second composite signal;
   signal divider means responsive to said first composite signal to supply first and second fractions thereof, said second fraction being larger than said first fracton;
   first comparator means for comparing said first fraction of said first composite signal to said second composite signal to develop a gain control signal responsive to the level of the former exceeding that of the latter;
   means for applying said gain control signal to control said gain-controlled amplifier, completing an automatic-gaincontrol feedback loop; and
   second comparator means for comparing said second fraction of said first composite signal to said second composite signal to develop an output signal responsive to the level of the former exceeding that of the latter.

4. A repeater for a pulse signal comprising:
   gain-controlled amplifier means receptive of an input pulse signal for producing first and second pulse signals balanced and superimposed on a common-mode signal, which pulse signals are of an amplitude dependent upon that of said input pulse signal, the first pulse signal superimposed on said common-mode signal being identifed as a first composite signal and the second pulse signal of opposite sense from said first pulse signal and superimposed on said common-mode signal being identified as a second composite signal;
   signal divider means responsive to said first composite signal to supply first and second and third fractions thereof, said second fraction being larger than the first and said third fraction being larger than the second;
   first comparator means for comparing said first fraction of said first composite signal to said second composite signal to develop a gain control signal when the level of the former exceeds that of the latter;
   means for applying said gain control signal to control the gain of said gain-controlled amplifier, completing an automatic-gain-control feedback loop for regulating the peak amplitudes of each of said first and said second pulse signals, to a standard peak pulse amplitude;
   second comparator means for comparing said second fraction of said first composite signal to said second composite signal and for, whenever the level of the former exceeds that of the latter, deciding that a pulse is present in said input pulse signal to provide a decision signal;
   a LC tank circuit;
   third comparator means for comparing said third fraction of said first composite signal to said second composite signal and for, whenever the level of the former exceeds that of the latter, exciting said LC tank circuit to cause oscillations therein;

limiter means for providing substantially square wave response to said oscillations in said LC tank circuit;

means for providing delayed pulse response to transitions of said square wave; and means connected to respond to the simultaneous occurrence of said delayed pulses and the decision signal from said second comparator means to generate an output pulse of prescribed duration.

5. A repeater, as set forth in Claim 4, wherein said signal divider means comprises means for dividing the first composite signal in such proportions that said second comparator means decides that a pulse is present in the input signal whenever the amplitudes of said first and said second pulse signals are greater than substantially 50% of standard peak pulse amplitude.

6. A repeater, as set forth in Claim 4, wherein said signal divider means comprises means for dividing the first composite signal in such proportions that said third comparator means excites said LC tank circuit whenever the amplitudes of said first and said second pulse signals are greater than approximately 70% of standard peak pulse amplitude.

7. A repeater, as set forth in Claim 4, wherein said signal divider means comprises means for dividing the first composite signal in such proportions that:

said second comparator means decides that a pulse is present in the input signal whenever the amplitudes of said first and said second pulse signals are greater than substantially 50% of standard peak pulse amplitude; and said third comparator means excites said LC tank circuit whenever the amplitudes of said first and said second pulse signals are greater than approximately 70% of standard peak pulse amplitude.

8. A repeater for a pulse signal, which pulse signal includes both positive-going and negative-going pulses, said repeater comprising:

gain-controlled amplifier means receptive of an input pulse signal for producing first and second pulse signals balanced and superimposed on a common-mode signal, which pulse signals are of an amplitude dependent upon that of said input pulse signal, the first pulse signal superimposed on said common-mode signal being identified as a first composite signal, and the second pulse signal of opposite sense from said first pulse signal and superimposed on said common-mode signal being identified as a second composite signal;

first signal divider means responsive to said first composite signal to supply first and second and third fractions thereof, said second fraction being larger than the first and said third fraction being larger than the second;

second signal divider means responsive to said second composite signal to supply first and second and third fractions thereof, which fractions are respectively related to the level of said second composite signal substantially the same as the first and second and third fractions of said first composite signal are respectively related to the level of said first composite signal;

first comparator means for comparing said first fraction of said first composite signal to said second composite signal and, when the level of the former exceeds that of the latter, developing a first portion of a gain control signal;

second comparator means for comparing said first fraction of said second composite signal to said first composite signal and, when the level of the former exceeds that of the latter, developing a second portion of said gain control signal;

means for combining said first and said second portions of said gain control signal and applying the resulting gain control signal to control the gain of said gain-controlled amplifier, completing an automatic-gain-control feedback loop for regulating the peak amplitudes of each of said first and said second pulse signals to a standard peak pulse amplitude;

third comparator means for comparing said second fraction of said first composite signal to said second composite signal and, whenever the level of the former exceeds that of the latter, deciding that a positive-going input pulse is present in said input pulse signal decision to provide a first decision signal;

fourth comparator means for comparing said second fraction of said second composite signal to said first composite signal and, whenever the level of the former exceeds that of the latter, deciding that a negative-going pulse is present in said input pulse signal to provide a second decision signal;

an LC tank circuit;

fifth comparator means for comparing said third fraction of said first composite signal to said second composite signal and, whenever the level of the former exceeds that of the latter, injecting energy into said LC tank circuit to stimulate oscillations therein;

sixth comparator means for comparing said third fraction of said second composite signal to said first composite signal and, whenever the level of the former exceeds that of the latter, injecting energy into said LC tank circuit to stimulate oscillations therein;

limiter means for providing substantially square wave response to said oscillations in said LC tank circuit;

means for providing delayed pulse responses to transitions of said substantially square wave response;

first pulse regenerating means connected to respond to the simultaneous occurrence of said delayed pulses and the first decision signal from said third comparator means to generate an output pulse of prescribed duration;

second pulse regenerating means connected to respond to the simultaneous occurrence of said delayed pulses and said second decision signal from said fourth comparator means to generate an output pulse of prescribed duration; and means connected to said first and said second pulse regenerating means for responding to their respective output pulses to provide a combined output pulse signal with positive-going pulses responsive to output pulses from one of said first and said second pulse regenerating means and with negative-going pulses responsive to output pulses from the other.

9. A repeater as claimed in Claim 8 wherein at least a particular one of said pulse regenerating means comprises:

AND gate means connected for receiving as input signals (a) the decision signal said particular pulse regenerating means is connected to respond to and (b) delayed pulses from said means for providing delayed pulse responses to transitions of square wave, said AND gate means responding to the simultaneous presence of said decision signal and said delayed pulses to produce a SET signal; and an RS flip-flop connected to receive RESET signal from said means for providing delayed pulse response to transitions of square wave, connected to receive a SET signal from said AND gate.

10. A repeater comprising, in combination:

means receptive of input pulses received by said repeater for providing first and second composite signals, each composite signal comprising a signal component of amplitude v superimposed upon a direct component of amplitude V, v always being smaller than V and being responsive to the amplitude of said input pulses, the signal component of second composite signal being concurrent with and of opposite polarity from that of the first composite signal;

means for dividing said first composite signal into first and second fractional signals, said first fractional signal comprising a smaller fraction of said first composite signal than said second fractional signal;

means for comparing said first fractional signal with the entire second composite signal thereby to derive a first control signal whenever said first fractional signal exceeds the entire second composite signal in amplitude;

means for comparing said second fractional signal with the entire second composite signal thereby to derive a second control signal whenever said second fractional signal exceeds the entire second composite signal in amplitude;

means responsive to the first control signal, when present, for attenuating said input pulses and thereby completing an automatic-gain-control loop for regulating the peak amplitudes of the signal components of said first and said second composite signals to be a fraction of V defined as 100% peak pulse amplitude; and means responsive to each occurrence of said second control signal for generation of an output pulse.

11. A repeater as set forth in Claim 10 wherein said first and said second fractional signals are so related that said second control signal is developed when the amplitudes of the signal components of said first and said second composite signals exceed a nominal 50% of peak pulse amplitude.

12. A repeater comprising, in combination:

means receptive of input pulses received by said repeater for providing first and second composite signals, each composite signal comprising a signal component of amplitude v superimposed on a direct component of amplitude V, v always being smaller than V and being responsive to the amplitude of said input pulses, the signal component of the second composite signal being concurrent with and of opposite polarity from that of the first composite signal;

means for dividing said first composite signal into first, second and third fractional signals, said fractional signals comprising successively larger fractions of said first composite signal;

means for comparing said first fractional signal with the entire second composite signal thereby to derive a first control signal whenever said first fractional signal exceeds the entire second composite signal in amplitude;

means for comparing said second fractional signal with the entire second composite signal thereby to derive a second control signal whenever said second fractional signal exceeds the entire second composite signal in amplitude;

means for comparing said third fractional signal with the entire second composite signal thereby to derive a third control signal whenever said third fractional signal exceeds the entire second composite signal in amplitude;

means responsive to the first control signal when present, for attenuating said input pulses and thereby completing an automatic gain control loop for regulating the peak amplitudes of the signal component of said first and said second composite signals to be a fraction of V defined as 100% peak pulse amplitude;

oscillatory means for providing a clock signal timed in response to occurrences of said third control signal; and means responsive to each occurrence of said second control signal for generating output pulses timed in accordance with said clock signal.

13. A repeater as set forth in Claim 12 wherein said first and said second fractional signals are so related that said second control signal is developed when the amplitudes of the signal components of said first and said second composite signals exceed a nominal 50% of peak pulse amplitude.

14. A repeater as set forth in Claim 13 wherein said first and said third fractional signals are so related that said third control signal is developed when the amplitudes of the signal components of said first and said second composite signals exceed a nominal 70% of peak pulse amplitude.

* * * * *

UNITED STATES PATENT OFFICE
CERTIFICATE OF CORRECTION

PATENT NO. : 3,962,549
DATED : June 8, 1976
INVENTOR(S) : Borys Zuk

It is certified that error appears in the above-identified patent and that said Letters Patent are hereby corrected as shown below:

Col 6, line 58, change "$R_p$" to --$R_b$--.

Col 10, line 45, change "the second" to --said first fraction and smaller than said second fraction--.

Col 11, line 53, change "than the second" to --than said first fraction and smaller than said second fraction--.

Col 14, lines 8-9, delete "frac-" in line 8 and the entirety of lines 9 and 10 in favor of --said third fractional signal being a larger fraction of said first composite signal than said first fractional signal and being a smaller fraction of said first composite signal than said second fractional signal;--.

Signed and Sealed this

Third Day of October 1978

[SEAL]

Attest:

RUTH C. MASON
Attesting Officer

DONALD W. BANNER
Commissioner of Patents and Trademarks